United States Patent [19]
Kim et al.

[11] Patent Number: 5,905,899
[45] Date of Patent: May 18, 1999

[54] POWER CONTROL DEVICE IN PRINTER AND METHOD FOR CONTROLLING THE SAME

[75] Inventors: Jung-Hwan Kim; Chang-Sub Lee, both of Seoul, Rep. of Korea

[73] Assignee: SamSung Electronics Co., Ltd., Suwon, Rep. of Korea

[21] Appl. No.: 08/854,721

[22] Filed: May 12, 1997

[30] Foreign Application Priority Data

May 15, 1996 [KR] Rep. of Korea ...................... 96-16270

[51] Int. Cl.⁶ .............................. G06F 1/26; G06F 1/32
[52] U.S. Cl. .............................. 395/750.01; 395/750.05
[58] Field of Search ........................ 395/750.05, 750.06, 395/750.01; 364/707, 492; 363/16, 37

[56] References Cited

U.S. PATENT DOCUMENTS

| | | | |
|---|---|---|---|
| 5,110,226 | 5/1992 | Sherman et al. ......................... | 400/88 |
| 5,163,124 | 11/1992 | Yabe et al. ......................... | 395/750.06 |
| 5,408,668 | 4/1995 | Tornai ................................. | 395/750.06 |
| 5,408,669 | 4/1995 | Stewart et al. ..................... | 395/750.01 |
| 5,477,476 | 12/1995 | Schanin et al. .................... | 395/750.06 |
| 5,486,726 | 1/1996 | Kim et al. .............................. | 307/120 |
| 5,514,859 | 5/1996 | Seigel ..................................... | 235/462 |
| 5,579,524 | 11/1996 | Kikinis ................................. | 395/750.06 |
| 5,594,672 | 1/1997 | Hicks ..................................... | 364/707 |
| 5,664,203 | 9/1997 | Hong et al. ........................ | 395/750.05 |
| 5,752,049 | 5/1998 | Lee ....................................... | 395/750.05 |

*Primary Examiner*—Gopal C. Ray
*Attorney, Agent, or Firm*—Robert E. Bushnell, Esq.

[57] ABSTRACT

A power control device and method capable of performing a power control of the printer in the host computer is provided. A host computer provides a power-on signal to the printer interface, which provides a power-on signal to the power control circuit which delivers DC power to the printer. The power-on signal originates either from a user input at the host computer or the flipping of a soft switch. Similarly, power to the peripheral printer may be disconnected in the same way.

18 Claims, 2 Drawing Sheets

POWER CONTROL DEVICE IN PRINTER AND METHOD FOR CONTROLLING THE SAME

This application makes reference to, incorporates the same herein, and claims all benefits accruing under 35 U.S.C. §119 arising from an application for a Power Control Device in Printer and Method for Controlling the Same earlier filed in the Korean Industrial Property Office on May 15$^{th}$, 1996 and there duly assigned Ser. No. 16270/1996.

FIELD OF THE INVENTION

The present invention relates to a printer and more particularly to a power control device and a method therefor in the printer.

DESCRIPTION OF THE RELATED ART

Commonly, the printer is utilized for printing a document or an image made in a host computer. There is a power control method of the printer using a soft power switch. There is also a method and apparatus for enabling and disabling peripherals such as printers from commands entered by the user at a host computer. For example, U.S. Pat. No. 5,486,726 for a Power-Supply Control System Of Peripheral Equipment of Computer to Kim et al. discloses a power supply control system for the peripheral equipment of a computer which generates a signal for automatically cutting off the input power supplied to the peripheral equipment after user has stopped working on a computer for a predetermined period of time. Power to the peripheral equipment is then resumed when data is input to the computer system through an input.

U.S. Pat. No. 5,408,668 for a Method and Apparatus For Controlling The Provision Of Power to Computer Peripherals to Tornai discloses the provision of power to a peripheral of a computer system being controlled by first receiving input signals from an input source such as a keyboard, mouse, printer port, or an occupancy sensor. The input signals are then processed to determine whether power should be provided to the peripheral, and if so, an activation signal is generated. In response to this activation signal, the peripheral is connected to an external power source thereby turning the peripheral on. Thereafter, the input signals continue to be processed to determine whether power should be disconnected from the peripheral, and if so, a deactivation signal is generated. The peripheral is disconnected from the power source in response to the deactivation signal to turn the peripheral off.

U.S. Pat. No 5,579,524 for an Optimized Power Supply System For Computer Equipment to Kikinis '524 discloses one of the power supplies serves the keyboard and its controller, and the keyboard controller is configured to turn the other power supply or supplies on and off in response to user input at the keyboard. The use of separate power supplies increases the efficiency of the computer when operating in reduced power modes.

I have not seen an arrangement where a power supply in a printer can be activated or deactivated at the whim of a user by entering in commands on a host computer.

SUMMARY OF THE INVENTION

It is therefore an object of the present invention to provide a power control device and method being capable of performing a power control in a printer from the host computer.

In order to accomplish the object, there is provided a power control device of a printer, made up of a host computer for providing a power-on signal for a printer interface in dependence upon a printer power-on-command by a user, an interfacing unit for receiving a power-on signal from the host computer and interfacing the received power-on signal, a buffer for connecting an output path of the power-on signal provided through the interfacing unit at the time of enabling, and cutting off the output path of the power-on signal at the time of disabling, a toggling unit for toggling the power-on signal inputted through the buffer, a buffer controller for enabling the buffer if an output of the toggling unit corresponds to an initial state, and disabling the buffer if the output of the toggling unit is toggled for the initial state, a power supply unit for converting an alternative current supplied into an operation power supply and then outputting the converted operation power supply, and a power controller for cutting off a path for providing the operation power supply for each part of the printer if the output of the toggle element corresponds to the initial state, and connecting the path for providing the operation power supply for each part of the printer if the output of the toggle element is toggled for the initial state.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
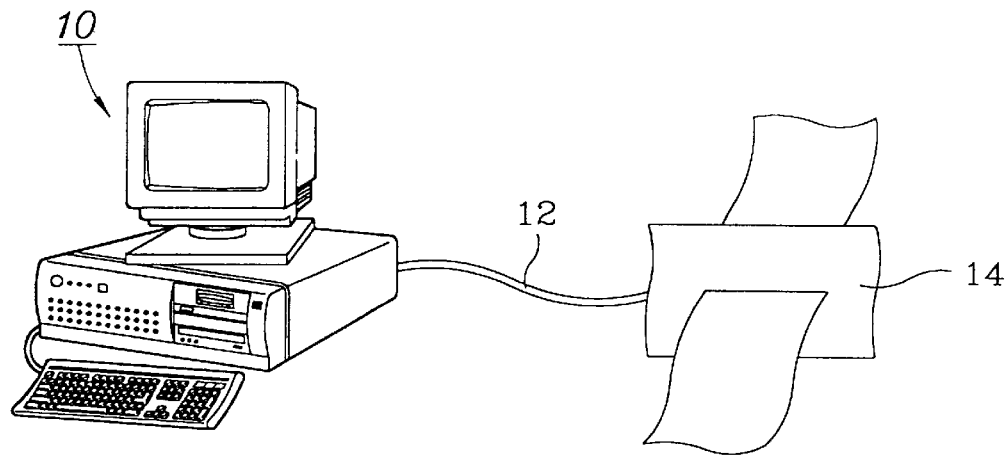
FIG. 1 is a diagram showing a common interconnection between a host computer and a printer.

Referring to FIG. 1, a host computer 10 is commonly connected to a printer 14 through a parallel interface cable 12 which is comprised of a host connector, a printer connector and a cable. Signals generated from the host computer 10 are applied to the host connector mounted on the host computer 10 and transmitted to the printer connector mounted on the printer 14 via the cable.

Here, the window print driver of the host computer 10 further comprises a menu which allows a user to input the power-on-command of the printer. If the user of the host computer 10 inputs the power-on-command on the printer driver, the printer driver provides a specific signal for the printer 14.

In an embodiment of the present invention, an initialization signal (Hereinafter, referred to as "INIT signal") of the printer 14 representing at pin No. 17 of the host connector is utilized as a signal for turning on the power supply of the printer 14 in the host computer 10 among multiple signals transmitted to the parallel interface cable 12.

Figure 4:
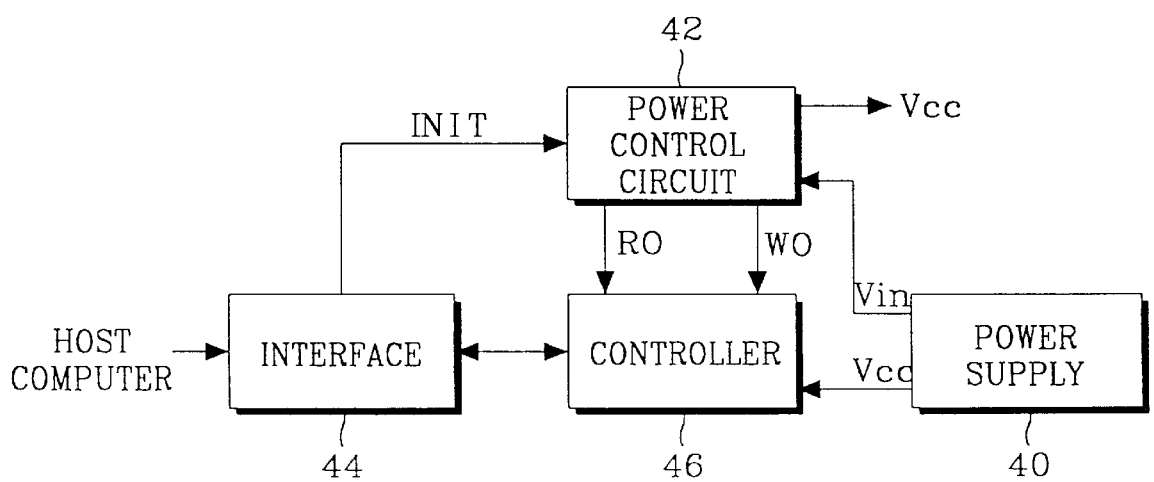
FIG. 4 is a schematic block diagram of a power control circuit of a printer according to a preferred embodiment of the present invention.

Referring to FIG. 4 illustrating the power control device according to a preferred embodiment of the present invention, the interface 44 provides the INIT signal among signals provided from the host computer, for the power control circuit 42. The power supply 40 converts the ac power into various types of dc power in case that the ac power is applied, and then provides the dc power for the power control circuit 42. In particular, the dc power Vin of FIG. 4 is shown as one of various dc powers.

If the INIT signal is applied in a state of power-off, the power control circuit 42 outputs the power Vin through an output terminal Vcc to thereby turn on the power supply. The signal outputted through the Vcc output terminal is called Vcc, and the signal Vcc is provided for each parts of the printer. Also, the power control circuit 42 turns on or off the power supply in dependence upon the soft power switching operation. If the user operates the soft power switch in the power-on state, the cutting operation of the controller 46 is performed so that the power control circuit 42 cannot make the power supply Vin outputted as the power supply Vcc.

Figure 2:
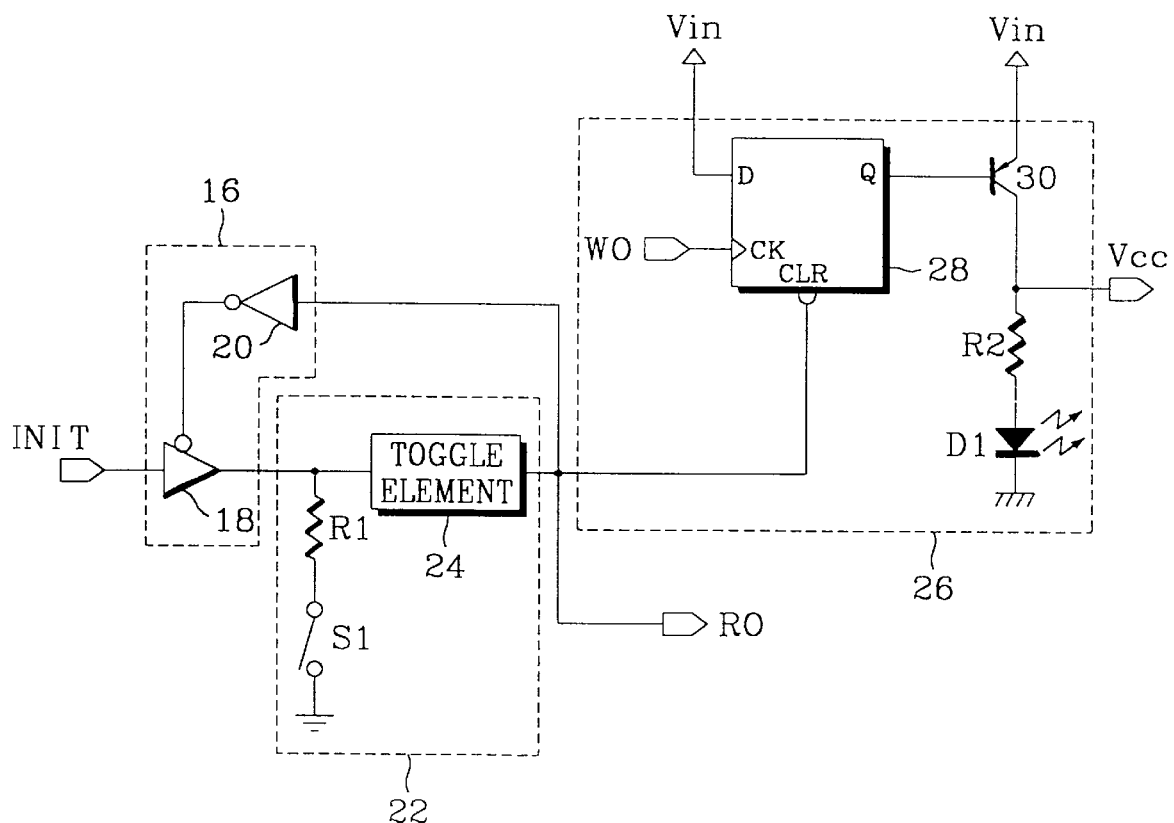
FIG. 2 is a detail circuit diagram of a power control circuit in a printer according to a preferred embodiment of the present invention.

Referring to FIG. 2 illustrating the power control circuit 42, the power control circuit 42 comprises an INIT signal detector 16, a toggle portion 22 and a power switching portion 26. The INIT signal detector 16 comprises a three-state-buffer 18 and an inverter 20. If an output of the inverter 20 is inputted to the three-state-buffer 18 to thereby make the output of the inverter 20 be in a high state, the three-state-buffer 18 is disabled, and if being in a low state, it is enabled. The output of the three-state-buffer 18 is generated only when the INIT signal is inputted to the three-state-buffer 18 through the interface portion 30 to thereby be enabled. The output of the three-state-buffer 18 is inputted to the toggle portion 22. The toggle portion 22 comprises a toggle element 24 and a soft power switch S1. The initial output signal of the toggle element 24 is in the high state, and the toggle element 24 toggles the state of the output signal whenever a low state of an input signal is inputted. The toggle element 24 comprises generally a T-flip flop. The signals inputted to the input terminal of the toggle element 24 are the INIT signal of the three-state-buffer 18 and a switching signal generated according to the user's operation of the soft power switch. The output of the toggle element 24 is provided as a control signal of the three-state-buffer 18 through the inverter 20.

The output of the toggle element 24 is inputted to a clear terminal CLR of the D-flip flop of the power switching portion 26, the power supply Vin is inputted to the input terminal D, and the signal WO is inputted to the clock terminal CK through the controller 46. The output of the D-flip flop is inputted to a base of a transistor 30. An emitter of the transistor 30 is connected to the power supply Vin, and the collector thereof is connected to the output terminal of the power supply Vcc. The transistor 30 becomes conductive in case that the output of the D-flip flop is in a low state, and otherwise not conductive. As the transistor 30 becomes conductive, the power supply Vin is outputted as the power supply Vcc through the output terminal Vcc. The power supply Vcc is provided to respective parts of the printer.

The power Vcc is again inputted to an anode of an emitting diode D1 through a resistor R2. A cathode of the emitting diode D1 is grounded. Accordingly, the emitting diode is emitted in case that the power Vin is outputted through the output terminal Vcc. In other words, emitting of the emitting diode D1 indicates a turning-on of the power supply. First of all, described will be the power-on process of the power control circuit 42. As the user of the host computer inputs a printer power-on-command to the window print drive, the window print drive provides the INIT signal for the printer.

The INIT signal is inputted to the three-state-buffer 18 through the interface portion 44. The output of the inverter 16 becomes in a low state since an initial output signal of the toggle element 24 is in the high state. Because the output of the inverter 16 is in the low state, the three-state-buffer 18 provides the INIT signal for the toggle element 24. The toggle element 24 toggles the output thereof by the INIT signal. Accordingly, the output of the toggle element 24 becomes in the low state. As the output of the toggle element 24 becomes in the low state, the three-state-buffer 18 is disabled. Accordingly, the toggle element 24 is not affected by next INIT signal.

The output of the low state of the toggle element 24 is inputted to the clear terminal of the D-flip flop 28. Accordingly, the D-flip flop 28 becomes in the low state. As the output of the D-flip flop 28 becomes in the low state, the transistor 30 becomes conductive, and accordingly the power supply Vin is outputted through the output terminal Vcc and then the emitting diode D1 is emitted.

Unlikely, in case that the soft power switch S1 is inputted, the power supply Vin is outputted through the output terminal Vcc in dependence upon that the toggle element 24 toggles the high state of the initial output signal to the low state thereof. Also, as the output of the toggle element 24 becomes in the low state, the INIT signal outputted from the host computer is cut off in the three-state buffer 18. In other words, after the power supply is turned on, the INIT signal outputted from the host computer does not affect to the power supply control operation of the printer.

Figure 3:
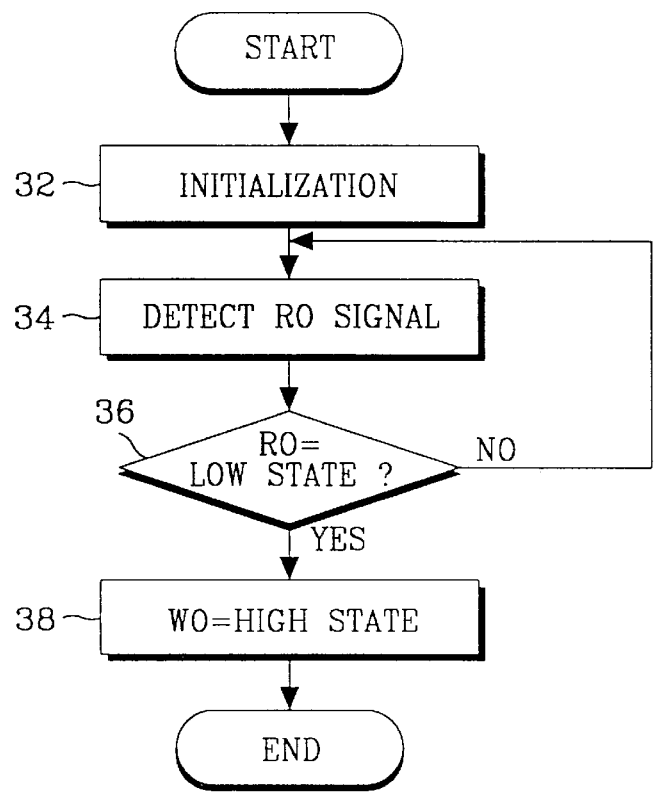
FIG. 3 is a flow chart for controlling a supply voltage of a printer according to a preferred embodiment of the present invention.

Henceforth, the case that the power supply of the printer is turned off will be described. First of all, the signal RO is outputted from the toggle element 24 and then inputted to the controller 46 so that the initial low state of the signal WO is converted into the high state and then outputted from the controller 46 in case that the signal RO is in the high state. Referring to FIG. 3 illustrating a flow chart of the controller 46, the operation of the controller 46 will be described in detail. First of all, since the initial state of the signal outputted from the toggle element 24 is in the high state, the initial state of the RO signal becomes in the high state. And, the initial state of the signal WO becomes in the low state.

If the power supply is turned on, the controller 46 performs the step 32. In the step of 32, the controller 46 performs the initialization process. After initialization, the controller 46 performs the step of 34. In the step of 34, the controller 46 checks the state of the signal RO. After checking, the controller 46 performs the step of 36. In the step of 36, the controller 46 checks whether the signal RO is in the high state. Here, that the signal RO is in the high state is that the user operates the soft power switch S1 in the state of power-on. At this time, the controller 46 performs the step of 38 if the signal RO is in the high state, and otherwise, the controller 46 again performs the step of 34. In the step of 38, the controller 38 converts the state of the signal RO into the high state and then the steps are terminated.

The step of turning off will be described with reference to the operation of the controller 46. First of all, since the power supply is turned on, the output of the toggle element 24 becomes in the low state, and accordingly the low state of the signal RO is generated. And, the D-flip flop 28 becomes in the clear state, and accordingly the transistor 30 becomes conductive, thereby to output the power supply Vin as the power supply Vcc. At this time, if the soft power switch S1 is inputted, the output of the toggle element 24 is toggled in the high state. Accordingly, the signal RO becomes in the high state, and accordingly the controller 46 converts the state of the signal WO into the high state. At this time, a rising edge is generated when the low state of the signal WO is converted into the high state. Since the signal WO is inputted to the D-flip flop 28, the output of the D-flip flop is generated in the high state. Accordingly, the transistor 30 becomes non-conductive, thereby to cut off the output path of the power supply Vin. Accordingly, each part of the printer is not provided with the power supply. As the toggle element 24 is toggled, the output of the inverter 20 becomes in the low state. As the output of the inverter 20 becomes in the low state, the three-state buffer 18 is enabled. Accordingly, the power supply is turned on in dependence upon the INIT signal inputted. As mentioned above, the present invention has an advantage in which the power supply is turned on in the window print driver of the host computer.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention. In the specification, for the convenience of explanation, the descriptions are limited to the automatic power-on function of the printer. However, it is apparent that an automatic power-off function may be realized in a similar way.

Also, the present invention can directly control the D-flip flop in the controller without utilizing the toggle element. At this time, if the INIT signal is checked in the controller, the power supply is turned on by clearing the D-flip flop. And, if the printing operation is not performed within a predetermined time in the state of turning on, the clock is provided for the D-flip flop, thereby to turn off the power supply. Accordingly, the scope of the present invention should not be limited to the embodiment mentioned above, but to the claim and the equivalent thereof.

What is claimed is:

1. A power control device for a printer, comprising:
    a host computer for providing a power-on signal for a printer interface in response to a user input;
    an interfacing unit for receiving said power-on signal and relaying said power-on signal to a power control circuit; and
    said power control circuit for receiving said power-on signal from said interfacing unit and delivering direct current power to said printer, wherein said power control circuit further comprises:
        a three state buffer having an input, an output, and a control terminal, said input terminal of said three state buffer being connected to said power-on signal;
        an inverter having an input and an output terminal, said output terminal connected to said control terminal of said three state buffer; and
        a T-flip-flop having an input and an output terminal, said input terminal connected to said output terminal of said three state buffer and said output of said T-flip flop connected to said input of said inverter.

2. The power control device of claim 1, a soft power switch providing said power-on signal for said printer interface.

3. The power control device of claim 1, a windows software program providing said power-on signal for said printer interface.

4. The power control device of claim 1, wherein said power control circuit further comprises:

a first resistor having a first and a second terminal, said first terminal connected to said output terminal of said three state buffer;
    a single pole single throw switch having a first end and a second end, said first end being connected to said second terminal of said first resistor, said second end of said single pole single throw switch being connected to ground; and
    a D-flip flop having a clear terminal, a clock terminal, a Data terminal, and an output terminal, said clear terminal being connected to said output of said T-flip-flop.

5. The power control device of claim 4, wherein said power control circuit further comprises:
    a voltage supply connected to said data terminal of said D-flip flop;
    a controller connected to said clock terminal of said D-flip flop and said clear terminal of said D-flip flop; and
    a bipolar junction transistor having a base terminal, an emitter terminal, and a collector terminal, said base terminal connected to said output of said D-flip flop, said emitter terminal connected to said voltage supply.

6. The power control device of claim 5, wherein said power control circuit further comprises:
    a second resistor having a first terminal and a second terminal, said first terminal connected to said collector terminal of said bipolar junction transistor; and
    a light emitting diode having an anode terminal and a cathode terminal, said anode terminal connected to said second end of said second resistor, said cathode terminal of said light emitting diode being grounded, said collector of said bipolar transistor delivering said direct current power to said printer.

7. The power control device of claim 6, a soft power switch providing said power-on signal for said printer interface.

8. The power control device of claim 6, a windows software program providing said power-on signal for said printer interface.

9. A power control device for a printer, comprising:
    a host computer for providing a power-on signal for a printer interface in response to a user input;
    an interfacing unit for receiving said power-on and relaying said power-on signal to a power control circuit; and
    said power control circuit for receiving said power-on from said interfacing unit and delivering direct current power to said printer, wherein said power control circuit further comprising:
        a three state buffer having an input, an output, and a control terminal, said input terminal of said three state buffer being connected to said power-on signal;
        an inverter having an input and an output terminal, said output terminal connected to said control terminal of said three state buffer;
        a T-flip-flop having an input and an output terminal, said input terminal connected to said output terminal of said three state buffer and said output of said T-flip flop connected to said input of said inverter;
        a first resistor having a first and a second terminal, said first terminal connected to said output terminal of said three state buffer;
        a single pole single throw switch having a first end and a second end, said first end being connected to said second terminal of said first resistor, said second end of said single pole single throw switch being connected to ground;

a D-flip flop having a clear terminal, a clock terminal, a Data terminal, and an output terminal, said clear terminal being connected to said output of said T-flip-flop;

a voltage supply connected to said data terminal of said D-flip flop;

a controller connected to said clock terminal of said D-flip flop and said clear terminal of said D-flip flop;

a bipolar junction transistor having a base terminal, an emitter terminal, and a collector terminal, said base terminal connected to said output of said D-flip flop, said emitter terminal connected to said voltage supply;

a second resistor having a first terminal and a second terminal, said first terminal connected to said collector terminal of said bipolar junction transistor; and a light emitting diode having an anode terminal and a cathode terminal, said anode terminal connected to said second end of said second resistor, said cathode terminal of said light emitting diode being grounded, said collector of said bipolar transistor delivering said direct current power to said printer.

10. A power control device for a printer, comprising:

a host computer for providing a power-off signal for a printer interface in response to a user input;

an interfacing unit for receiving said power-off signal and relaying said power-off signal to a power control circuit; and said power control circuit for receiving said power-off signal from said interfacing unit and disconnecting direct current power from said printer, wherein said power control circuit further comprises:

a three state buffer having an input, an output, and a control terminal, said input terminal of said three state buffer being connected to said power-off signal;

an inverter having an input and an output terminal, said output terminal connected to said control terminal of said three state buffer; and a T-flip-flop having an input and an output terminal, said input terminal connected to said output terminal of said three state buffer and said output of said T-flip flop connected to said input of said inverter.

11. The power control device of claim 10, a soft power switch providing said power-off signal for said printer interface.

12. The power control device of claim 10, a windows software program providing said power-off signal for said printer interface.

13. The power control device of claim 10, wherein said power control circuit further comprises:

a first resistor having a first and a second terminal, said first terminal connected to said output terminal of said three state buffer;

a single pole single throw switch having a first end and a second end, said first end being connected to said second terminal of said first resistor, said second end of said single pole single throw switch being connected to ground; and a D-flip flop having a clear terminal, a clock terminal, a Data terminal, and an output terminal, said clear terminal being connected to said output of said T-flip-flop.

14. The power control device of claim 13, wherein said power control circuit further comprises:

a voltage supply connected to said data terminal of said D-flip flop;

a controller connected to said clock terminal of said D-flip flop and said clear terminal of said D-flip flop; and a bipolar junction transistor having a base terminal, an emitter terminal, and a collector terminal, said base terminal connected to said output of said D-flip flop, said emitter terminal connected to said voltage supply.

15. The power control device of claim 14, wherein said power control circuit further comprises:

a second resistor having a first terminal and a second terminal, said first terminal connected to said collector terminal of said bipolar junction transistor; and a light emitting diode having an anode terminal and a cathode terminal, said anode terminal connected to said second end of said second resistor, said cathode terminal of said light emitting diode being grounded, said collector of said bipolar transistor delivering said direct current power to said printer.

16. The power control device of claim 15, a soft power switch providing said power-off signal for said printer interface.

17. The power control device of claim 15, a windows software program providing said power-off signal for said printer interface.

18. A power control device for a printer, comprising:

a host computer for providing a power-off signal for a printer interface in response to a user input;

an interfacing unit for receiving said power-off signal and relaying said power-off signal to a power control circuit; and said power control circuit for receiving said power-off signal from said interfacing unit and disconnecting direct current power from said printer, wherein said power control circuit further comprising:

a three state buffer having an input, an output, and a control terminal, said input terminal of said three state buffer being connected to said power-off signal;

an inverter having an input and an output terminal, said output terminal connected to said control terminal of said three state buffer;

a T-flip-flop having an input and an output terminal, said input terminal connected to said output terminal of said three state buffer and said output of said T-flip flop connected to said input of said inverter;

a first resistor having a first and a second terminal, said first terminal connected to said output terminal of said three state buffer;

a single pole single throw switch having a first end and a second end, said first end being connected to said second terminal of said first resistor, said second end of said single pole single throw switch being connected to ground;

a D-flip flop having a clear terminal, a clock terminal, a Data terminal, and an output terminal, said clear terminal being connected to said output of said T-flip-flop;

a voltage supply connected to said data terminal of said D-flip flop;

a controller connected to said clock terminal of said D-flip flop and said clear terminal of said D-flip flop;

a bipolar junction transistor having a base terminal, an emitter terminal, and a collector terminal, said base terminal connected to said output of said D-flip flop, said emitter terminal connected to said voltage supply;

a second resistor having a first terminal and a second terminal, said first terminal connected to said collector terminal of said bipolar junction transistor; and a light emitting diode having an anode terminal and a cathode terminal, said anode terminal connected to said second end of said second resistor, said cathode terminal of said light emitting diode being grounded, said collector of said bipolar transistor delivering said direct current power to said printer.

* * * * *